US012776802B2

(12) United States Patent
Jin et al.

(10) Patent No.: US 12,776,802 B2
(45) Date of Patent: Oct. 27, 2026

(54) WIRELESS COMMUNICATION CIRCUIT, BLUETOOTH COMMUNICATION SWITCHING METHOD, AND ELECTRONIC DEVICE

(71) Applicant: Honor Device Co., Ltd., Shenzhen (CN)

(72) Inventors: Jie Jin, Shenzhen (CN); Dong Wang, Shenzhen (CN); Shuyang Min, Shenzhen (CN); Yiang Xiong, Shenzhen (CN); Chiyang Xiao, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 225 days.

(21) Appl. No.: 18/840,683

(22) PCT Filed: Apr. 24, 2023

(86) PCT No.: PCT/CN2023/090369

§ 371 (c)(1),
(2) Date: Aug. 22, 2024

(87) PCT Pub. No.: WO2024/037025

PCT Pub. Date: Feb. 22, 2024

(65) Prior Publication Data

US 2025/0175208 A1 May 29, 2025

(30) Foreign Application Priority Data

Aug. 18, 2022 (CN) ......................... 202210993102.2

(51) Int. Cl.
*H04B 1/401* (2015.01)
*H04B 1/44* (2006.01)

(52) U.S. Cl.
CPC ............... *H04B 1/401* (2013.01); *H04B 1/44* (2013.01)

(58) Field of Classification Search
CPC H04B 1/401; H04B 1/44; H04B 1/40; H04W 88/06; Y02D 30/70
See application file for complete search history.

(56) References Cited

U.S. PATENT DOCUMENTS 8,594,056 B2 * 11/2013 Rick ...................... H04B 1/406 370/336
9,497,799 B2 * 11/2016 Liu ....................... H04W 88/06
(Continued)

FOREIGN PATENT DOCUMENTS

CN 102026322 A 4/2011
CN 102461327 A 5/2012
(Continued)

OTHER PUBLICATIONS

Zhang Haolun, "Research and Design of Networking System based on Low Energy Bluetooth MESH", China Master's Theses Full-text Database, Jun. 1, 2019, total 110 pages.
(Continued)

*Primary Examiner* — Ankur Jain
(74) *Attorney, Agent, or Firm* — Conley Rosa, P.C.

(57) ABSTRACT

A wireless communication circuit, a Bluetooth communication switching method, and an electronic device. The wireless communication circuit includes: a processor, a switching circuit, a modulator demodulator, a first FEM, and a second FEM. The first FEM supports wireless fidelity Wi-Fi communication or Bluetooth communication. The second FEM supports cellular communication or Bluetooth communication. The processor is configured to: acquire whether the first FEM performs Wi-Fi communication; and when the first FEM performs Wi-Fi communication, transmit a first control command to the switching circuit to control the
(Continued)

switching circuit to detect whether the modulator demodulator transmits a mobile industry processor interface MIPI command to the second FEM, and when the modulator demodulator does not transmit an MIPI command to the second FEM, control the second FEM to perform Bluetooth communication.

20 Claims, 8 Drawing Sheets

(56) References Cited

U.S. PATENT DOCUMENTS

| | | | | |
|---|---|---|---|---|
| 10,135,482 | B2 | 11/2018 | Adams et al. | |
| 10,701,538 | B1 * | 6/2020 | Elliot | H04W 72/0453 |
| 11,265,052 | B1 * | 3/2022 | Proejts | H04B 7/0602 |
| 11,683,850 | B2 * | 6/2023 | Hsiao | H04B 1/7156 455/41.2 |
| 12,052,780 | B2 | 7/2024 | Chen | |
| 2012/0165008 | A1 * | 6/2012 | Ge | H04W 88/04 455/426.1 |
| 2012/0329395 | A1 * | 12/2012 | Husted | H04B 1/0057 455/552.1 |
| 2013/0267224 | A1 * | 10/2013 | Krishnaswamy | H04W 52/0229 455/426.1 |
| 2014/0226502 | A1 * | 8/2014 | Behnamfar | H04W 52/04 370/336 |
| 2017/0279479 | A1 * | 9/2017 | Adams | H04B 1/0483 |
| 2019/0222997 | A1 * | 7/2019 | Reshef | H04W 52/50 |
| 2020/0046923 | A1 * | 2/2020 | Hanafialamdari | G16H 20/40 |
| 2020/0267605 | A1 * | 8/2020 | Bae | G06F 9/547 |
| 2020/0305103 | A1 * | 9/2020 | Chen | H04W 56/001 |
| 2022/0225225 | A1 * | 7/2022 | Cui | H04B 17/328 |
| 2022/0264672 | A1 * | 8/2022 | Chen | H04W 4/80 |

FOREIGN PATENT DOCUMENTS

| | | | |
|---|---|---|---|
| CN | 103620970 | A | 3/2014 |
| CN | 104272802 | A | 1/2015 |
| CN | 104518817 | A | 4/2015 |
| CN | 105009670 | A | 10/2015 |
| CN | 107241114 | A | 10/2017 |
| CN | 111314921 | A | 6/2020 |
| CN | 111556476 | A | 8/2020 |
| CN | 112399390 | A | 2/2021 |
| CN | 112468179 | A | 3/2021 |
| CN | 113038440 | A | 6/2021 |
| CN | 113676269 | A | 11/2021 |
| CN | 116054870 | A | 5/2023 |
| KR | 20150114826 | A | 10/2015 |

OTHER PUBLICATIONS

A. A. L. Neyestanak and S. R. J. Naraghi, "Impact of Variations of Bluetooth Transmitting Power in the Presence of WLAN Interfering Signal," 2011 Fifth Asia Modelling Symposium, Manila, Philippines, 2011, pp. 232-235.

* cited by examiner

WIRELESS COMMUNICATION CIRCUIT, BLUETOOTH COMMUNICATION SWITCHING METHOD, AND ELECTRONIC DEVICE

CROSS-REFERENCE TO RELATED APPLICATIONS

This is a U.S. National Stage of International Application No. PCT/CN2023/090369 filed on Apr. 24, 2023, which claims priority to Chinese Patent Application No. 202210993102.2, filed with the China National Intellectual Property Administration on Aug. 18, 2022, both of which are incorporated herein by reference in their entireties.

TECHNICAL FIELD

This application relates to the field of communication, and in particular to a wireless communication circuit, a Bluetooth communication switching method, and an electronic device.

BACKGROUND

Among existing electronic devices such as mobile phones, Bluetooth (bluetooth, BT) and wireless fidelity (wireless fidelity, Wi-Fi) share an antenna in a time division manner. When the amount of data transmitted by Wi-Fi is large, it will reduce the communication rate of Bluetooth, thus influencing the communication quality of Bluetooth.

SUMMARY

Embodiments of this application disclose a wireless communication circuit, a Bluetooth communication switching method, and an electronic device, which are used for improving a communication quality of Bluetooth communication.

To achieve the foregoing objective, the following technical solutions are used in the embodiments of this application:

According to a first aspect, a wireless communication circuit is provided. The wireless communication circuit includes: a processor, a switching circuit, a modulator demodulator (modulator demodulator, MDM), a first front-end module (front-end modules, FEM), and a second FEM. The processor is coupled to the switching circuit, the modulator demodulator and the first FEM, the modulator demodulator is coupled to the second FEM through the switching circuit, the first FEM supports wireless fidelity Wi-Fi communication or Bluetooth communication, and the second FEM supports cellular communication or Bluetooth communication; and the processor is configured to: acquire communication state information of the first FEM, where the communication state information is used for indicating whether the first FEM performs Wi-Fi communication: when the communication state information indicates that the first FEM performs Wi-Fi communication, transmit a first control command to the switching circuit, where the first control command is used for controlling the switching circuit to detect whether the modulator demodulator transmits a mobile industry processor interface (mobile industry processor interface, MIPI) command to the second FEM, and when the modulator demodulator does not transmit an MIPI command to the second FEM, control the second FEM to perform Bluetooth communication; and when the communication state information indicates that the first FEM does not perform Wi-Fi communication, transmit a second control command to the switching circuit, where the second control command is used for controlling the switching circuit to detect whether the modulator demodulator transmits an MIPI command to the second FEM, and when the modulator demodulator does not transmit an MIPI command to the second FEM, directly conduct the modulator demodulator with the second FEM so as to enable the modulator demodulator to control the second FEM to perform cellular communication.

In the wireless communication circuit provided in this embodiment of this application, the first FEM supports wireless fidelity Wi-Fi communication or Bluetooth communication: when the first FEM performs Wi-Fi communication and the MDM does not transmit an MIPI command to the second FEM, the second FEM is controlled to perform Bluetooth communication, thus switching some or all of Bluetooth communication of the first FEM to a relatively idle second FEM, preventing time-division multiplexing of Wi-Fi communication and Bluetooth communication from occupying resources for Bluetooth communication, and improving the communication quality of Bluetooth communication.

In a possible implementation, the switching circuit includes a controller, an MIPI slave module, an MIPI master module, and a bypass gating circuit: the controller is coupled to the modulator demodulator through the MIPI slave module and the bypass gating circuit, and the controller is further coupled to the second FEM through the MIPI master module and the bypass gating circuit: the MIPI slave module is configured to convert an MIPI command from the modulator demodulator from a MIPI bus format to an on-chip bus format and transmit same to the controller: the MIPI master module is configured to convert an MIPI command from the controller from the on-chip bus format to the MIPI bus format and transmit same to the second FEM through the bypass gating circuit: the controller is configured to: when the first control command is received, control the bypass gating circuit to conduct the MIPI slave module with the modulator demodulator and conduct the MIPI master module with the second FEM, and detect whether the modulator demodulator transmits an MIPI command to the second FEM through the MIPI slave module, and when the modulator demodulator does not transmit an MIPI command to the second FEM, transmit a first MIPI command to the second FEM through the MIPI master module, where the first MIPI command is used for instructing the second FEM to perform Bluetooth communication: the controller is further configured to: when the second control command is received, detect whether the modulator demodulator transmits an MIPI command to the second FEM through the MIPI slave module, and when the modulator demodulator does not transmit an MIPI command to the second FEM, control the bypass gating circuit to directly conduct the modulator demodulator with the second FEM, and transmit a second MIPI command to the second FEM through the MIPI master module, where the second MIPI command is used for instructing the second FEM to perform cellular communication.

This implementation discloses a possible implementation of how to implement a switching circuit.

In a possible implementation, the controller is further configured to: after the first MIPI command is transmitted to the second FEM through the MIPI master module, receive and cache an MIPI command from the MDM through the MIPI slave module; and after the second MIPI command is transmitted to the second FEM through the MIPI master module, transmit the cached MIPI command from the modulator demodulator to the second FEM through the MIPI master module.

This implementation ensures that the control logic between the modulator demodulator and the second FEM remains consistent before and after switching.

In a possible implementation, the processor is specifically configured to: when the communication state information indicates that the first FEM performs Wi-Fi communication, transmit the first control command to the switching circuit after preset time.

This implementation can prevent frequent switching of Bluetooth communication between the first FEM and the second FEM. The advantage of this solution is that determination conditions are simple and there will be no frequent switching from beginning to end.

In a possible implementation, the processor is specifically configured to: when the communication state information indicates that the first FEM performs Wi-Fi communication and the number of times that the first FEM switches between performing Wi-Fi communication and skipping performing Wi-Fi communication within first preset time is less than a number threshold, transmit the first control command to the switching circuit.

This implementation can prevent frequent switching of Bluetooth communication between the first FEM and the second FEM. The advantage of this solution is that it can detect more quickly, switch the state as soon as possible after connecting to Wi-Fi, and provide a better experience.

In a possible implementation, the processor is further configured to: when the number of times that the first FEM switches between performing Wi-Fi communication and skipping performing Wi-Fi communication within the first preset time is greater than or equal to the number threshold, acquire the communication state information of the first FEM after second preset time.

This implementation can avoid never switching the state, and can switch the state normally when the Wi-Fi connection is stable.

According to a second aspect, a Bluetooth communication switching method is provided. The Bluetooth communication switching method includes: acquiring communication state information of a first FEM, where the first FEM supports wireless fidelity Wi-Fi communication or Bluetooth communication, and the communication state information is used for indicating whether the first FEM performs Wi-Fi communication: transmitting a first control command to a switching circuit when the communication state information indicates that the first FEM performs Wi-Fi communication, where the first control command is used for controlling the switching circuit to detect whether a modulator demodulator transmits a mobile industry processor interface MIPI command to a second FEM, and when the modulator demodulator does not transmit an MIPI command to the second FEM, controlling the second FEM to perform Bluetooth communication, where the second FEM supports cellular communication or Bluetooth communication; and when the communication state information indicates that the first FEM does not perform Wi-Fi communication, transmitting a second control command to the switching circuit, where the second control command is used for controlling the switching circuit to detect whether the modulator demodulator transmits an MIPI command to the second FEM, and when the modulator demodulator does not transmit an MIPI command to the second FEM, directly conducting the modulator demodulator with the second FEM so as to enable the modulator demodulator to control the second FEM to perform cellular communication.

In a possible implementation, the method further includes: when the first control command is received, controlling a bypass gating circuit to conduct an MIPI slave module with the modulator demodulator and conduct an MIPI master module with the second FEM, and detecting whether the modulator demodulator transmits an MIPI command to the second FEM through the MIPI slave module, and when the modulator demodulator does not transmit an MIPI command to the second FEM, transmitting a first MIPI command to the second FEM through the MIPI master module, where the first MIPI command is used for instructing the second FEM to perform Bluetooth communication; and when the second control command is received, detecting whether the modulator demodulator transmits an MIPI command to the second FEM through the MIPI slave module, and when the modulator demodulator does not transmit an MIPI command to the second FEM, controlling the bypass gating circuit to directly conduct the modulator demodulator with the second FEM, and transmitting a second MIPI command to the second FEM through the MIPI master module, where the second MIPI command is used for instructing the second FEM to perform cellular communication.

In a possible implementation, the method further includes: after the first MIPI command is transmitted to the second FEM through the MIPI master module, receiving and caching an MIPI command from the MDM through the MIPI slave module; and after the second MIPI command is transmitted to the second FEM through the MIPI master module, transmitting the cached MIPI command from the MDM to the second FEM through the MIPI master module.

In a possible implementation, the transmitting a first control command to a switching circuit when the communication state information indicates that the first FEM performs Wi-Fi communication includes: when the communication state information indicates that the first FEM performs Wi-Fi communication, transmitting the first control command to the switching circuit after preset time.

In a possible implementation, the transmitting a first control command to a switching circuit when the communication state information indicates that the first FEM performs Wi-Fi communication includes: when the communication state information indicates that the first FEM performs Wi-Fi communication and the number of times that the first FEM switches between performing Wi-Fi communication and skipping performing Wi-Fi communication within first preset time is less than a number threshold, transmitting the first control command to the switching circuit.

In a possible implementation, the method further includes: when the number of times that the first FEM switches between performing Wi-Fi communication and skipping performing Wi-Fi communication within the first preset time is greater than or equal to the number threshold, acquiring the communication state information of the first FEM after second preset time.

According to a third aspect, an electronic device is provided. The electronic device includes the wireless communication circuit according to the first aspect and any implementation thereof, or includes a processor and a memory. The memory stores instructions, and the method according to the second aspect or any implementation is performed when the processor executes the instructions.

According to a fourth aspect, a computer-readable storage medium is provided. The computer-readable storage medium includes instructions. The instructions, when executed on an electronic device, cause an electronic device to perform the method according to the second aspect and any implementation thereof.

According to a fifth aspect, a computer program product including instructions is provided. The instructions, when executed on an electronic device, cause the electronic device to perform the method according to the second aspect and any implementation thereof.

According to a sixth aspect, a chip system is provided. The chip system includes a processor configured to support an electronic device to implement a function involved in the second aspect. In a possible design, the apparatus further includes an interface circuit. The interface circuit may be configured to receive signals from another apparatus (such as a memory) or transmit signals to another apparatus (such as a communication interface). The chip system may include a chip, or may include other discrete devices.

For technical effects brought by the second aspect to the sixth aspect, refer to technical effects brought by the first aspect and any implementation thereof, which will not be repeated here.

DESCRIPTION OF EMBODIMENTS

First, some concepts involved in this application will be described below.

In the embodiments of this application, terms such as "first" and "second" are merely used for distinguishing features of the same type, and cannot be understood as an indication of relative importance, a quantity, or a sequence.

In the embodiments of this application, the terms "exemplary" or "for example" is used to represent giving an example, an illustration, or a description. Any embodiment or design scheme described as an "exemplary" or "for example" in this application should not be explained as being more preferred or having more advantages than another embodiment or design scheme. In particular, the terms such as "exemplary" and "for example" as used herein are intended to present the related concept in a specific implementation.

In the embodiments of this application, the terms "couple" or "connection" should be understood in a broad sense. For example, the connection may be a physically direct connection, or an indirect connection realized through an electronic device, such as a connection realized through a resistor, an inductor, a capacitor, or other electronic devices.

Figure 1:
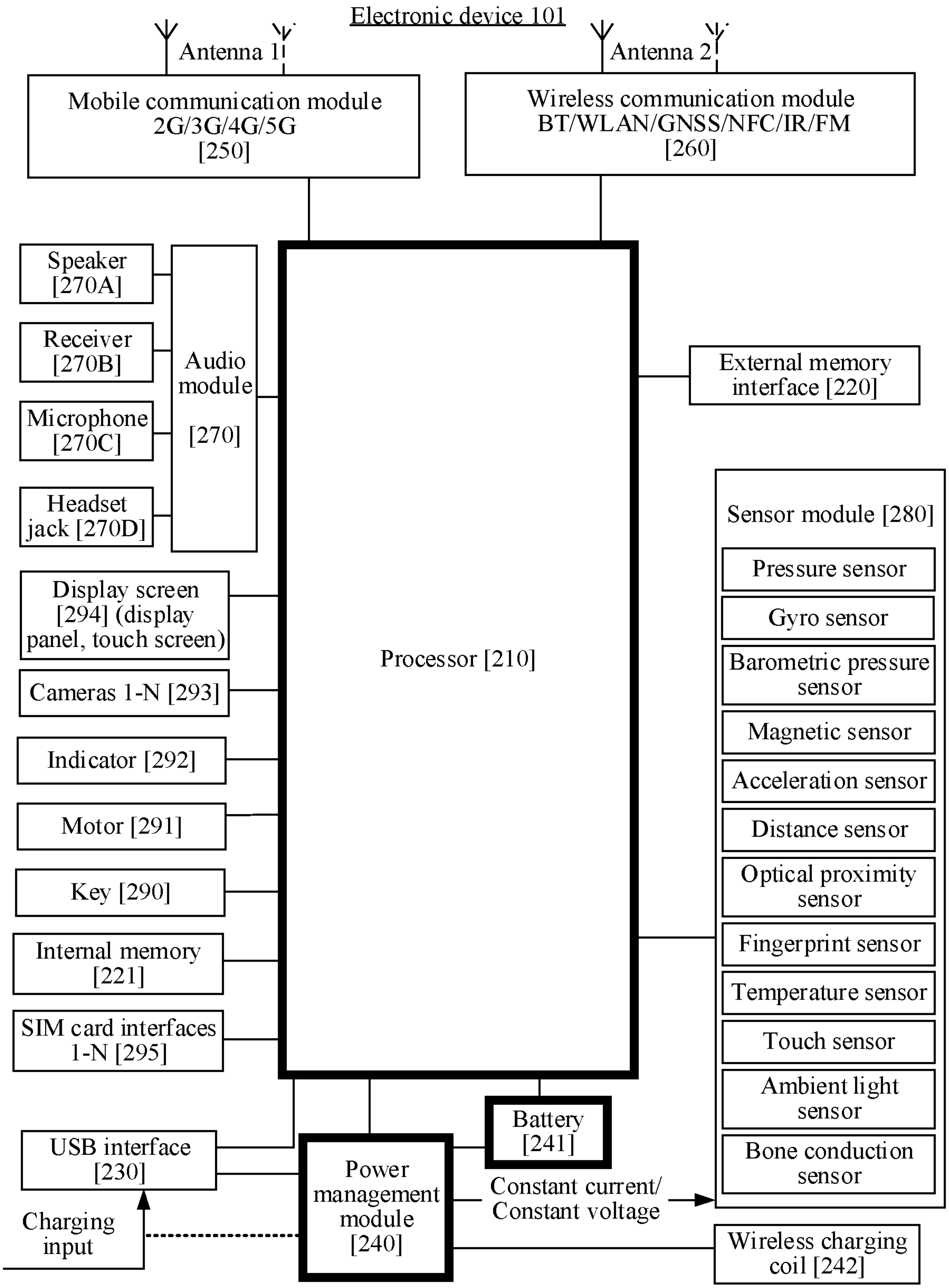
FIG. 1 is a schematic structural diagram of an electronic device according to an embodiment of this application.

An embodiment of this application provides an electronic device. The electronic device may be a device with a display function. The electronic device may be mobile or fixed. The electronic device may be deployed on land (such as indoors or outdoors, either hand-held or vehicle-mounted, etc.), on water (such as ships, etc.), and in air (such as airplanes, balloons or satellites, etc.). The electronic device may be referred to as a user equipment (user equipment, UE), access terminal, terminal unit, subscriber unit (subscriber unit), terminal station, mobile station (mobile station, MS), movable station, terminal agent or terminal device, etc. For example, the terminal device may be a mobile phone, a tablet computer, a notebook computer, a smart bracelet, a smart watch, a headset, a smart speaker, a virtual reality (virtual reality; VR) device, an augmented reality (augmented reality, AR) device, a terminal related to industrial control (industrial control), a terminal related to self-driving (self-driving), a terminal related to remote medical (remote medical), a terminal related to a smart grid (smart grid), a terminal related to transportation safety (transportation safety), a terminal related to a smart city (smart city), a terminal related to a smart home (smart home), or the like. The specific type and structure of the electronic device are not limited in the embodiments of this application. A possible structure of the electronic device will be described below:

Taking the electronic device being a mobile phone as an example, FIG. 1 illustrates a possible structure of an electronic device 101. The electronic device 101 may include a processor 210, an external memory interface 220, an internal memory 221, a universal serial bus (universal serial bus, USB) interface 230, a power management module 240, a battery 241, a wireless charging coil 242, an antenna 1, an antenna 2, a mobile communication module 250, a wireless communication module 260, an audio module 270, a speaker 270A, a receiver 270B, a microphone 270C, a headset jack 270D, a sensor module 280, a key 290, a motor 291, an indicator 292, a camera 293, a display screen 294, a subscriber identification module (subscriber identification module, SIM) card interface 295, and the like.

The sensor module 280 may include a pressure sensor, a gyro sensor, a barometric pressure sensor, a magnetic sensor, an acceleration sensor, a distance sensor, an optical proximity sensor, a fingerprint sensor, a temperature sensor, and a touch sensor, an ambient light sensor, a bone conduction sensor, and the like.

It may be understood that a schematic structure in this embodiment of this application does not constitute a specific limitation on the electronic device 101. In some other embodiments of this application, the electronic device 101 may include more or fewer components than those shown in the figure, or some components may be combined, or some components may be divided, or different component arrangements may be used. The components illustrated may be implemented by hardware, software, or a combination of software and hardware.

The processor 210 may include one or more processing units. For example, the processor 210 may be a field programmable gate array (field programmable gate array; FPGA), an application specific integrated circuit (application specific integrated circuit, ASIC), a system on chip (system on chip, SoC), a central processing unit (central processing unit, CPU), an application processor (application processor, AP), a network processor (network processor, NP), a digital signal processor (digital signal processor, DSP), a micro controller unit (micro controller unit, MCU), a programmable logic device (programmable logic device, PLD), a modulation and demodulation processor, a graphics processing unit (graphics processing unit, GPU), an image signal processor (image signal processor, ISP), a controller, a video codec, a baseband processor, a neural-network processing unit (neural-network processing unit, NPU), or the like. Different processing units may be separate devices, or may be integrated into one or more processors. For example, the processor 210 may be an application processor AP. Alternatively, the processor 210 may be integrated into a system on chip (system on chip, SoC). Alternatively, the processor 210 may be integrated into an integrated circuit (integrated circuit, IC) chip. The processor 210 may include an analog front end (analog front end, AFE) and a micro-controller unit (micro-controller unit, MCU) in an IC chip.

The controller may be a nerve center and a command center of the electronic device 101. The controller may generate an operation control signal according to an instruction operation code and a time-sequence signal, and control obtaining and execution of instructions.

A memory may be further provided in the processor 210 to store instructions and data. In some embodiments, the memory in the processor 210 is a cache memory. The memory may store instructions or data that is just used or cyclically used by the processor 210. If the processor 210 needs to use the instructions or data again, the processor may directly call the instructions or data from the memory. This avoids repeated access and reduces the waiting time of the processor 210, thus improving the system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a USB interface.

It may be understood that an interface connection relationship between the modules illustrated in this embodiment of this application is merely an example for description, and does not constitute a limitation on a structure of the electronic device 101. In some other embodiments of this application, the electronic device 101 may alternatively use an interface connection manner different from that in the foregoing embodiment, or use a combination of a plurality of the interface connection manners.

The power management module 240 is configured to receive a charging input from a charger. The charger may be a wireless charger (such as a wireless charging dock of the electronic device 101 or other devices that can charge the electronic device 101 wirelessly), or a wired charger. For example, the power management module 240 may receive a charging input from the wired charger through the USB interface 230. The power management module 240 may receive a wireless charging input through the wireless charging coil 242 of the electronic device.

While charging the battery 241, the power management module 240 may further supply power to the electronic device. The power management module 240 receives an input from the battery 241 to supply power to the processor 210, the internal memory 221, the external memory interface 220, the display screen 294, the camera 293, the wireless communication module 260, and the like. The power management module 240 may be further configured to monitor parameters such as the battery capacity; cycle count, health state (leakage and impedance) of the battery 241. In some other embodiments, the power management module 240 may also be provided in the processor 210.

The wireless communication function of the electronic device 101 may be implemented by using the antenna 1, the antenna 2, the mobile communication module 250, the wireless communication module 260, the modulation and demodulation processor, the baseband processor, and the like.

The electronic device 101 implements a display function by using the GPU, the display screen 294, the application processor, and the like. The GPU is a microprocessor for image processing and connects the display screen 294 and the application processor. The GPU is configured to perform mathematical and geometric calculation, and is configured to render graphics. The processor 210 may include one or more GPUs, and execute program instructions to generate or change display information.

The display screen 294 is configured to display an image, a video and the like. The display screen 294 includes a display panel and a touch screen. In some embodiments, the electronic device 101 may include one or N display screens 294, where N is a positive integer greater than one.

The electronic device 101 can implement a photographing function by using the ISP, the camera 293, the video codec, the GPU, the display screen 294, the application processor, and the like. The ISP is configured to process data fed back by the camera 293. In some embodiments, the ISP may be provided in the camera 293. The camera 293 is configured to capture a still image or video. In some embodiments, the electronic device 101 may include one or N cameras 293, where N is a positive integer greater than one.

The external memory interface 220 may be configured to connect to an external storage card, for example, a micro SanDisk (micro SanDisk, Micro SD) card, to expand the storage capability of the electronic device 101. The external storage card communicates with the processor 210 by using the external memory interface 220, to implement a data storage function, for example, storing files such as music and videos into the external storage card.

The internal memory 221 may be configured to store a computer-executable program code. The computer-executable program code includes instructions. The processor 210 runs the instructions stored in the internal memory 221, to implement various functional applications and data processing of the electronic device 101. In addition, the internal memory 221 may include a high-speed random access memory, and may also include a non-volatile memory, for example, at least one magnetic disk storage device, a flash memory device, a universal flash storage (universal flash storage, UFS), and the like.

The memory involved in the embodiments of this application may be a volatile memory or the non-volatile memory; or may include both the volatile memory and the non-volatile memory: The non-volatile memory may be a read-only memory (read-only memory; ROM), a programmable ROM (programmable ROM, PROM), an erasable PROM (erasable PROM, EPROM), an electrically EPROM (electrically EPROM, EEPROM) or a flash memory: The volatile memory may be a random access memory (random access memory; RAM), and is used as an external cache. Through exemplary but non-restrictive description, many forms of RAMs, such as static RAM (static RAM, SRAM), dynamic RAM (dynamic RAM, DRAM), synchronous DRAM (synchronous DRAM, SDRAM), double data rate SDRAM (double data rate SDRAM, DDR SDRAM), enhanced SDRAM (enhanced SDRAM, ESDRAM), synchlink DRAM (synchlink DRAM, SLDRAM), and direct rambus RAM (direct rambus RAM, DR RAM), may be used. It is to be understood that the memories involved in the systems and methods described herein are intended to include, but not limited to, these memories and memories of any other suitable type.

The electronic device 101 may implement an audio function by using the audio module 270, the speaker 270A, the receiver 270B, the microphone 270C, the headset jack 270D, the application processor, and the like, for example, playing music or recording sounds.

The audio module 270 is configured to convert digital audio information into analog audio signal outputs, and is also configured to convert analog audio inputs into digital audio signals. In some embodiments, the audio module 270 may be provided in the processor 210, or some functional modules of the audio module 270 may be provided in the processor 210. The speaker 270A, also referred to as “horn”, is configured to convert an audio electrical signal into a sound signal. The phone receiver 270B, also referred to as “receiver”, is configured to convert an audio electrical signal into a sound signal. The microphone 270C, also referred to as “voice tube” or “mike”, is configured to convert a sound signal into an electrical signal. At least one microphone 270C may be arranged in the electronic device 101. The headset jack 270D is configured to be connected to a wired headset. The headset jack 270D may be a USB interface 230, or may be a 3.5 mm open mobile terminal platform (open mobile terminal platform, OMTP) standard interface, or a cellular telecommunications industry association of the USA (cellular telecommunications industry association of the USA, CTIA) standard interface.

The key 290 includes a power key, a volume key, and the like. The button 290 may be a mechanical button. It may also be a touch button. The electronic device 101 may receive a button input, and generate a button signal input related to user setting and function control of the electronic device 101. The motor 291 may generate a vibration prompt. The motor 291 may be used for an incoming call vibration prompt and touch vibration feedback. The indicator 292 may be an indicator light, and may be configured to indicate a charging state or a battery change, or may be configured to indicate a message, a missed call, a notification, or the like. The SIM card interface 295 is configured to connect an SIM card. The SIM card may be inserted into the SIM card interface 295 or plugged from the SIM card interface 295, to come into contact with or be separated from the electronic device 101. The electronic device 101 may support one or N SIM card interfaces, where N is a positive integer greater than one. The SIM card interface 295 can support a Nano SIM (Nano SIM) card, a Micro SIM (Micro SIM) card, an SIM card, and the like. In some embodiments, the electronic device 101 uses an embedded SIM (embedded SIM, eSIM) card. The eSIM card may be embedded in the electronic device 101 and cannot be separated from the electronic device 101.

The antenna 1 and the antenna 2 are configured to transmit and receive an electromagnetic wave signal. Each antenna in the electronic device 101 may be configured to cover one or more communication frequency bands. Different antennas may further be multiplexed to improve the utilization rate of the antennas. For example, the antenna 1 may be multiplexed into a diversity antenna of a wireless local area network. In some other embodiments, the antennas may be used with a tuning switch.

The mobile communication module 250 may provide a solution to wireless communication including 2G/3G/4G/5G applied to the electronic device 101. The wireless communication module 260 may provide a solution to wireless communication including wireless local area network (wireless local area networks, WLAN) (for example, wireless fidelity (wireless fidelity; Wi-Fi) network), Bluetooth (Bluetooth, BT), and global navigation satellite system (global navigation satellite system, GNSS), frequency modulation (frequency modulation, FM), near field communication (near field communication, NFC) technology, infrared (infrared, IR) technology, and the like applied to the electronic device 101. In some embodiments, the antenna 1 and the mobile communication module 250 of the electronic device 101 are coupled, and the antenna 2 and the wireless communication module 260 are coupled, so that the electronic device 101 can communicate with networks and another device through a wireless communication technology.

Figure 2:
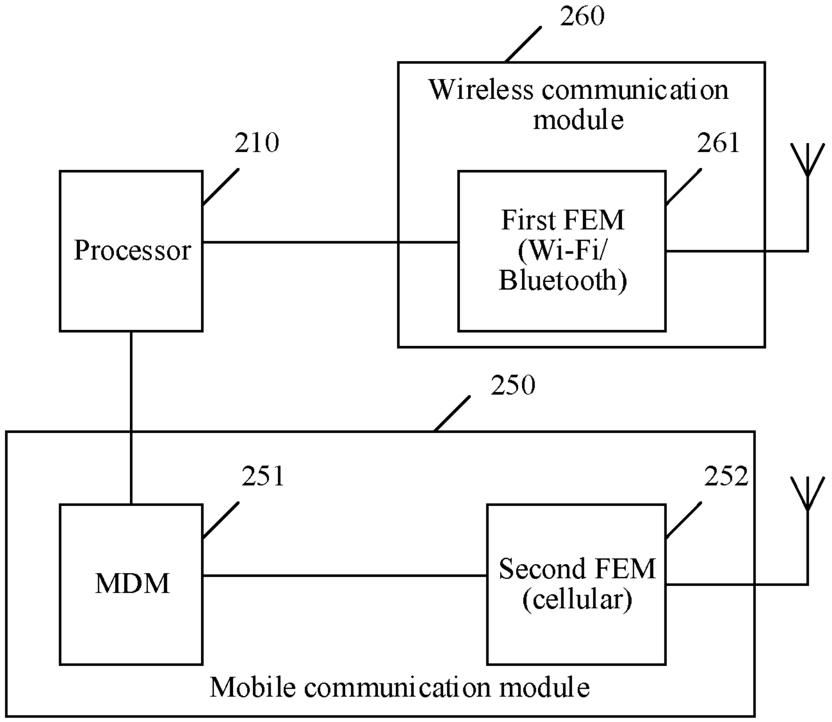
FIG. 2 is a schematic structural diagram of another electronic device according to an embodiment of this application.

As shown in FIG. 2, in the existing technology, the wireless communication module 260 includes a first FEM 261, and the mobile communication module 250 includes an MDM 251 and a second FEM 252. The first FEM 261 and the second FEM 252 are configured to amplify a transmitted or received radio-frequency signal. The MDM 251 is configured to modulate a baseband signal into a radio-frequency signal through digital signal modulation, and to demodulate a radio-frequency signal into a digital signal. The second FEM 252 implements the transmission of radio frequency signals for mobile communication (i.e., cellular communication), while the first FEM 261 implements time-division transmission of radio frequency signals for Wi-Fi and Bluetooth. When a user enters indoors from outside and allows the electronic device to perform Wi-Fi communication, the amount of data transmitted by the electronic device through Wi Fi is relatively large, while the amount transmitted through cellular communication is relatively small. Due to the shared FEM and antenna between Wi-Fi and Bluetooth, the communication rate of Bluetooth will be reduced, thus causing an influence to the communication quality of Bluetooth, such as a decrease in call quality of Bluetooth headset, a decrease in Bluetooth data transmission rate, etc.

In regard to this, an embodiment of this application provides a wireless communication circuit applied to the electronic devices, which can reduce or prevent the influence on the communication rate of Bluetooth by occupying the FEM and antenna of cellular communication through Bluetooth.

Figure 3:
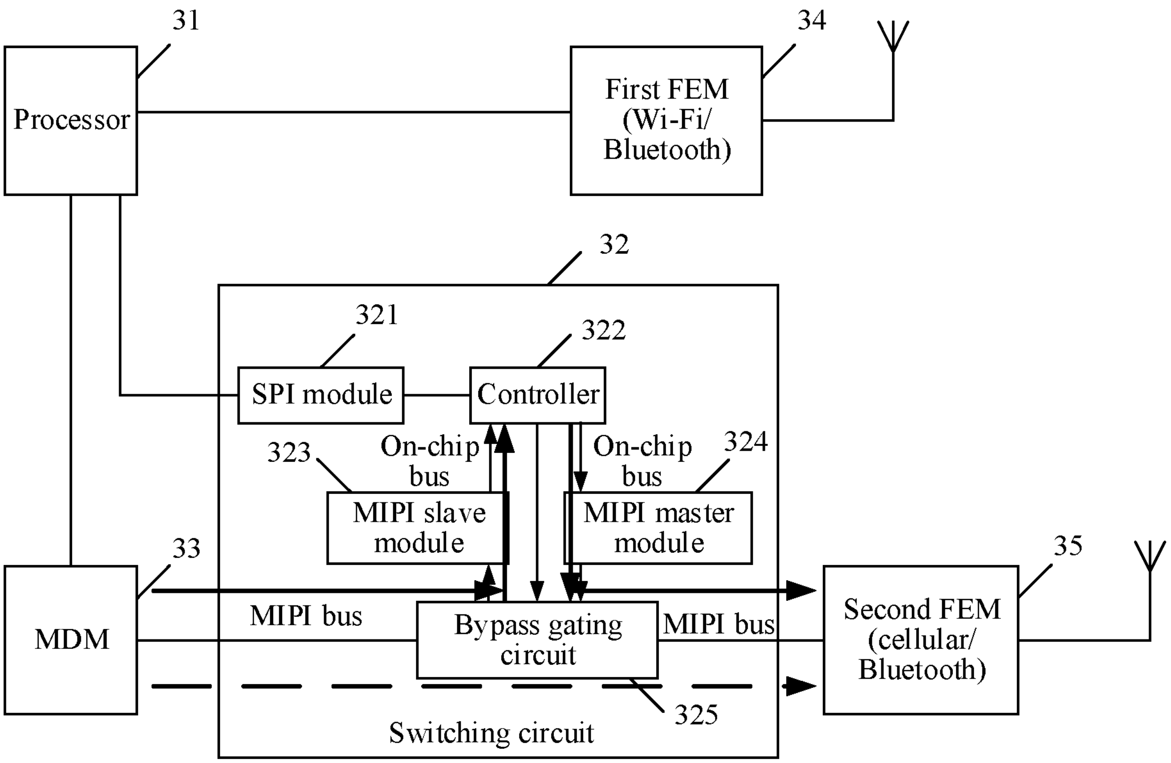
FIG. 3 is a structural schematic diagram of a wireless communication circuit according to an embodiment of this application.

As shown in FIG. 3, the wireless communication circuit includes a processor 31, a switching circuit 32, an MDM 33, a first FEM 34, and a second FEM 35. The switching circuit 32 includes a serial peripheral interface (serial peripheral interface, SPI) module 321, a controller 322, a mobile industry processor interface (mobile industry processor interface, MIPI) slave module 323, an MIPI master module 324, and a bypass (bypass) gating circuit 325. The processor 31 is coupled to the switching circuit 32, the MDM 33 and the first FEM 34. The processor 31 is coupled to the controller 322 through the SPI module 321 in the switching circuit 32. The MDM 33 is coupled to the second FEM 35 through the switching circuit 32. The MDM 33, the switching circuit 32 and the second FEM 35 perform communication with each other by using an MIPI bus.

The first FEM 34 and the second FEM 35 are configured to amplify a transmitted or received radio-frequency signal. The first FEM 34 can support time-division multiplexing of Wi-Fi communication or Bluetooth communication, while the second FEM 35 can support cellular communication or Bluetooth communication.

The MDM 33 is configured to transmit an MIPI command to the second FEM 35 to control the second FEM 35 to perform cellular communication. The MDM 33 is further configured to generate a radio-frequency signal from a baseband signal through digital signal modulation, transmit same to the outside through the second FEM 35, and demodulate a radio-frequency signal received through the second FEM 35 to obtain a digital signal. The MDM 33 is further configured to transmit the communication state information of the second FEM 35 to the processor 31.

The SPI module 321 is configured to implement serial communication between the processor 31 and the controller 322.

The bypass gating circuit 325 is controlled by the controller 322, and is configured to directly conduct the MDM 33 with the second FEM 35 (a path indicated by the dashed arrow in the figure), or conduct the MDM 33 with the controller 322 through the MIPI slave module 323, and conduct the controller 322 with the second FEM 35 through the MIPI master module 324 (a path indicated by the solid arrow in the figure). The bypass gating circuit 325 can be implemented through an analog circuit such as complementary metal oxide semiconductor (complementary metal oxide semiconductor, CMOS) or through a Verilog register transfer level (register transfer level, RTL) code, which is not limited here.

The MIPI slave module 323 is connected with the MDM 33 by using an MIPI bus. The MIPI slave module 323 is connected with the controller 322 by using an on-chip bus (such as an advanced high performance bus (advanced high performance bus, AHB) bus). The MIPI slave module 323 is configured to convert an MIPI command (such as a first MIPI command involved later) from the MDM 33 from the MIPI bus format to the on-chip bus format and transmit same to the controller 322.

The MIPI master module 324 is connected with the second FEM 35 through the MIPI bus. The MIPI master module 324 is connected with the controller 322 through the on-chip bus. The MIPI master module 324 is configured to convert an MIPI command (such as a second MIPI command involved later) from the controller 322 from the on-chip bus format to the MIPI bus format and transmit same to the second FEM 35.

The processor 31 can acquire communication state information of the first FEM 34, such as whether it performs Wi-Fi communication (or performs Wi-Fi communication or Bluetooth communication). The processor 31 can also acquire communication state information of the second FEM 35, such as whether it performs cellular communication. The processor 31 can also transmit a first control command or a second control command (as specifically described later) to the controller 322 in the switching circuit 32 through the SPI module 321 according to the communication state information of the first FEM 34, to control the second FEM 35 to switch between a cellular communication state and a Bluetooth communication state through the switching circuit 32.

The controller 322 is configured to control the bypass gating circuit 325 to switch between a bypass mode and a non-bypass mode according to the first control command or second control command from the processor 31.

Figure 4:
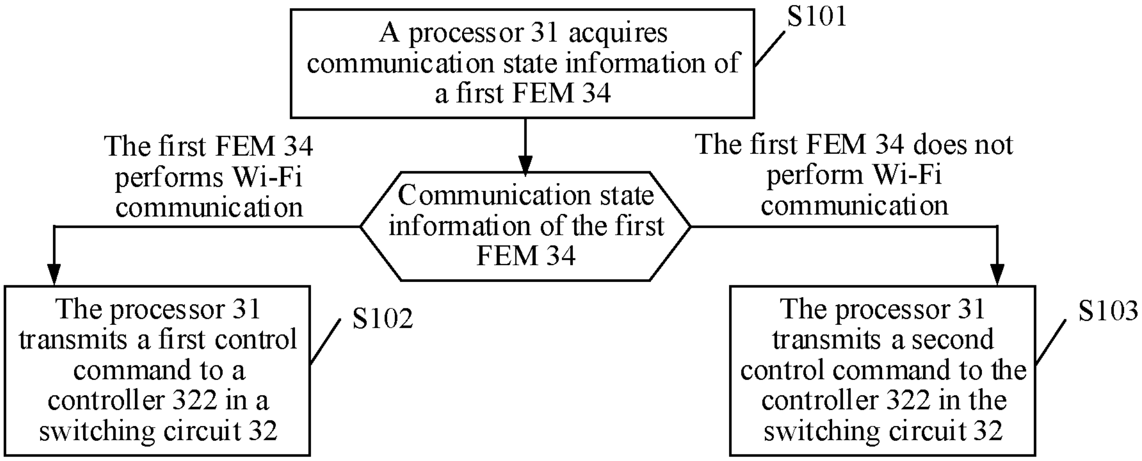
FIG. 4 is a flowchart of a Bluetooth communication switching method according to an embodiment of this application.

Specifically, the wireless communication circuit can perform a Bluetooth communication switching method described in this application, and as shown in FIG. 4, the method includes the following steps:

In S101, a processor 31 acquires communication state information of a first FEM 34.

The communication state information of the first FEM 34 is used for indicating whether the first FEM 34 performs Wi-Fi communication, or the communication state information of the first FEM 34 is used for indicating whether the first FEM 34 performs Wi-Fi communication or performing Bluetooth communication.

In S102, when the communication state information of the first FEM 34 indicates that the first FEM 34 performs Wi-Fi communication (or referred to as establishing a Wi-Fi connection), the processor 31 transmits a first control command to a controller 322 in a switching circuit 32.

The first control command is used for controlling the switching circuit 32 to detect whether an MDM 33 transmits an MIPI command to a second FEM 35. When the MDM 33 does not transmit an MIPI command to the second FEM 35, the switching circuit 32 controls the second FEM 35 to perform Bluetooth communication.

Figure 5:
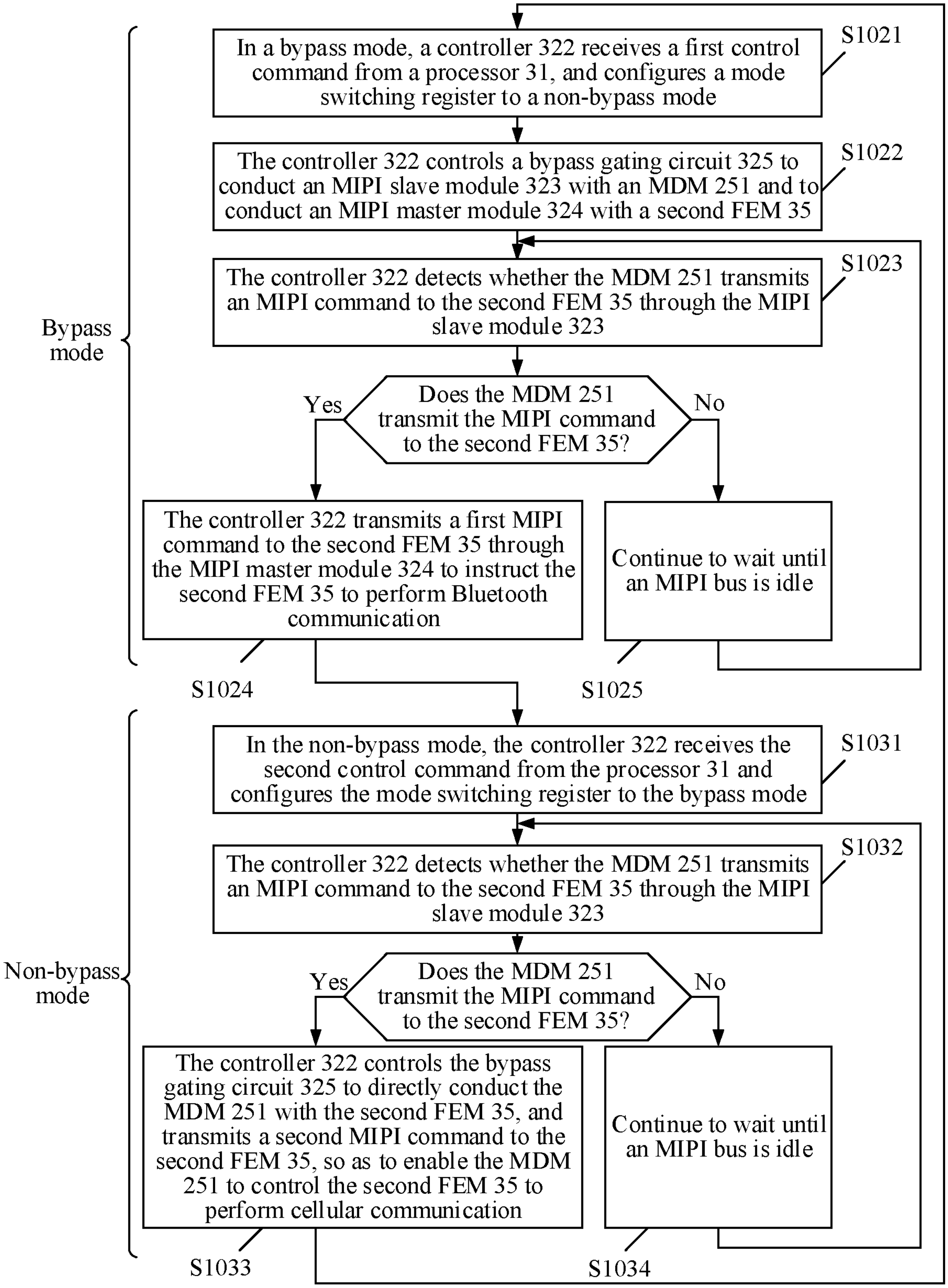
FIG. 5 is a flowchart of another Bluetooth communication switching method according to an embodiment of this application.

As shown in S1021-S1025 in FIG. 5, in a bypass mode, when the controller 322 in the switching circuit 32 receives the first control command from the processor 31, the controller 322 configures a mode switching register to a non-bypass mode and controls a bypass gating circuit 325 to switch to the non-bypass mode. The controller 322 controls the bypass gating circuit 325 to conduct an MIPI slave module 323 with the MDM 251, and to conduct an MIPI master module 324 with the second FEM 35. The controller 322 detects whether the MDM 251 transmits an MIPI command to the second FEM 35 through the MIPI slave module 323. When it is detected that the MDM 251 does not transmit an MIPI command to the second FEM 35 (that is, the MIPI bus is idle), the controller 322 transmits a first MIPI command to the second FEM 35 through the MIPI master module 324. When it is detected that the MDM 251 transmits an MIPI command to the second FEM 35, it continues to wait until the MIPI bus is idle. The detected MIPI command from the MDM 251 may be any MIPI command. The first MIPI command is used for instructing the second FEM 35 to perform Bluetooth communication. That is to say; during the period that the MDM 251 does not transmit an MIPI command to the second FEM 35, the controller 322 switches the second FEM 35 from a cellular communication state to a Bluetooth communication state to avoid competing with the MDM 251 for the MIPI bus, thus avoiding transmission errors.

After the controller 322 transmits the first MIPI command to the second FEM 35 through the MIPI master module 324 to instruct the second FEM 35 to perform Bluetooth communication, the controller 322 continues to receive and cache an MIPI command from the MDM 251 through the MIPI slave module 323. When the controller 322 controls the second FEM 35 to switch back to the Bluetooth communication state, the cached MIPI command from the MDM 251 is transmitted to the second FEM 35 through the MIPI master module 324, so that the control logic between the MDM 251 and the second FEM 35 remains consistent before and after switching.

In addition, due to unstable Wi-Fi connections in certain scenarios, in order to prevent frequent switching of Bluetooth communication between the first FEM 34 and the second FEM 35, the processor 31 may determine whether to switch Bluetooth communication according to the time that the first FEM 34 performs Wi Fi communication. Alternatively; the processor 31 may determine whether to switch Bluetooth communication according to the number of times that the first FEM 34 switches between performing Wi-Fi communication and skipping performing Wi-Fi communication within preset time.

In a possible implementation, when the communication state information of the first FEM 34 indicates that the first FEM 34 performs Wi-Fi communication, the processor 31 transmits a first control command to the controller 322 in the switching circuit 32 after preset time (for example, one minute). That is, after the electronic device is stably connected to the Wi-Fi connection for preset time, the processor 31 transmits a first control command to the controller 322 in the switching circuit 32. The advantages of this solution are that determination conditions are simple and frequent switching will not occur from beginning to end.

In another possible implementation, when the communication state information of the first FEM 34 indicates that the first FEM 34 performs Wi-Fi communication and the number of times that the first FEM 34 switches between performing Wi-Fi communication and skipping performing Wi-Fi communication within first preset time (for example, 10 seconds) is less than a number threshold (for example, three times), the processor 31 transmits the first control command to the controller 322 in the switching circuit 32. When the number of times that the first FEM 34 switches between performing Wi-Fi communication and skipping performing Wi-Fi communication within the first preset time is greater than or equal to the number threshold, the processor 31 acquires the communication state information of the first FEM 34 after second preset time (for example, five minutes), so as to determine again whether to transmit the first control command. The advantage of this solution is that it can detect more quickly, switch the state as soon as possible after connecting to Wi-Fi, and provide a better experience.

Figure 6:
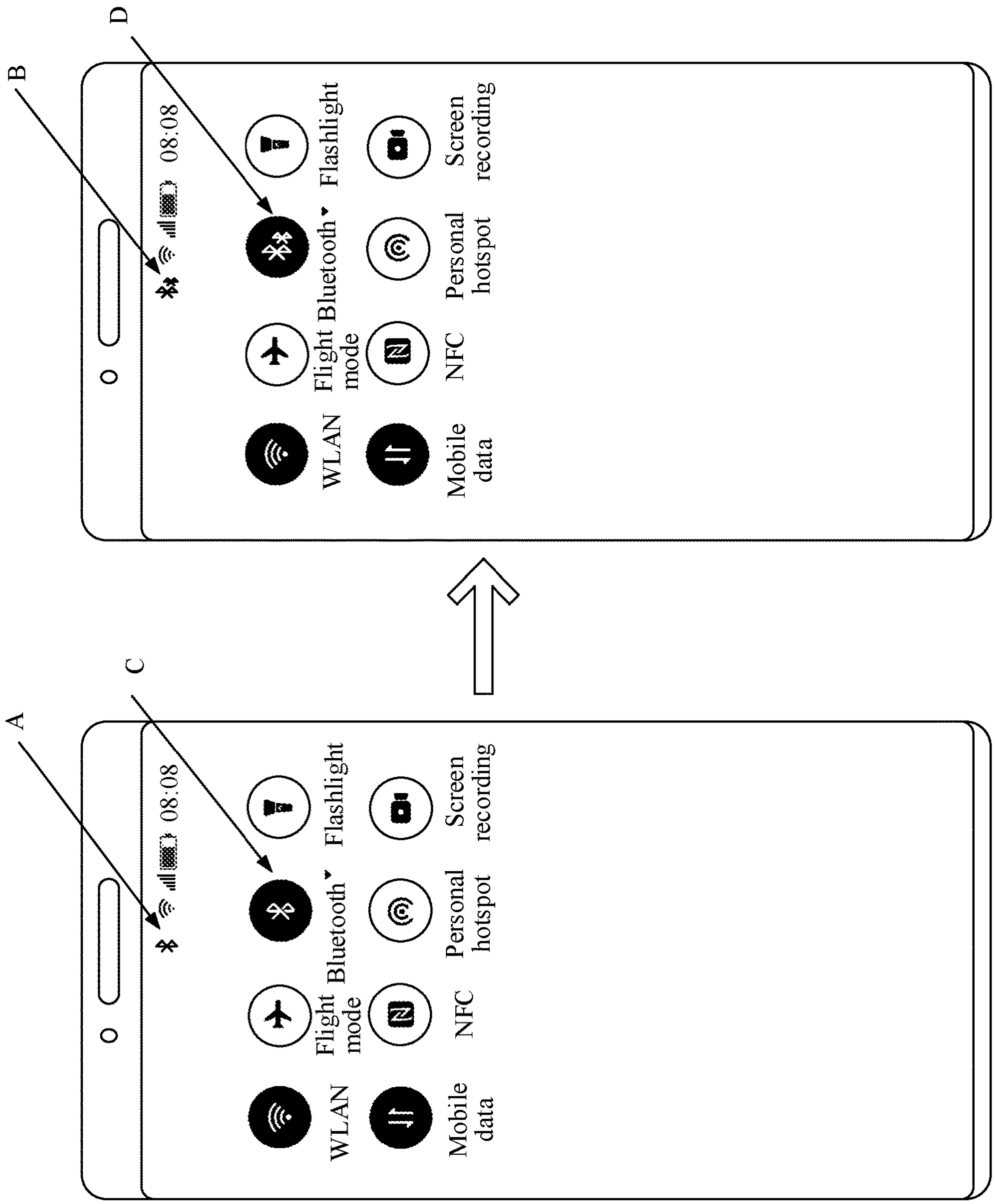
FIG. 6 is a schematic diagram of a display interface according to an embodiment of this application.
Figure 7:
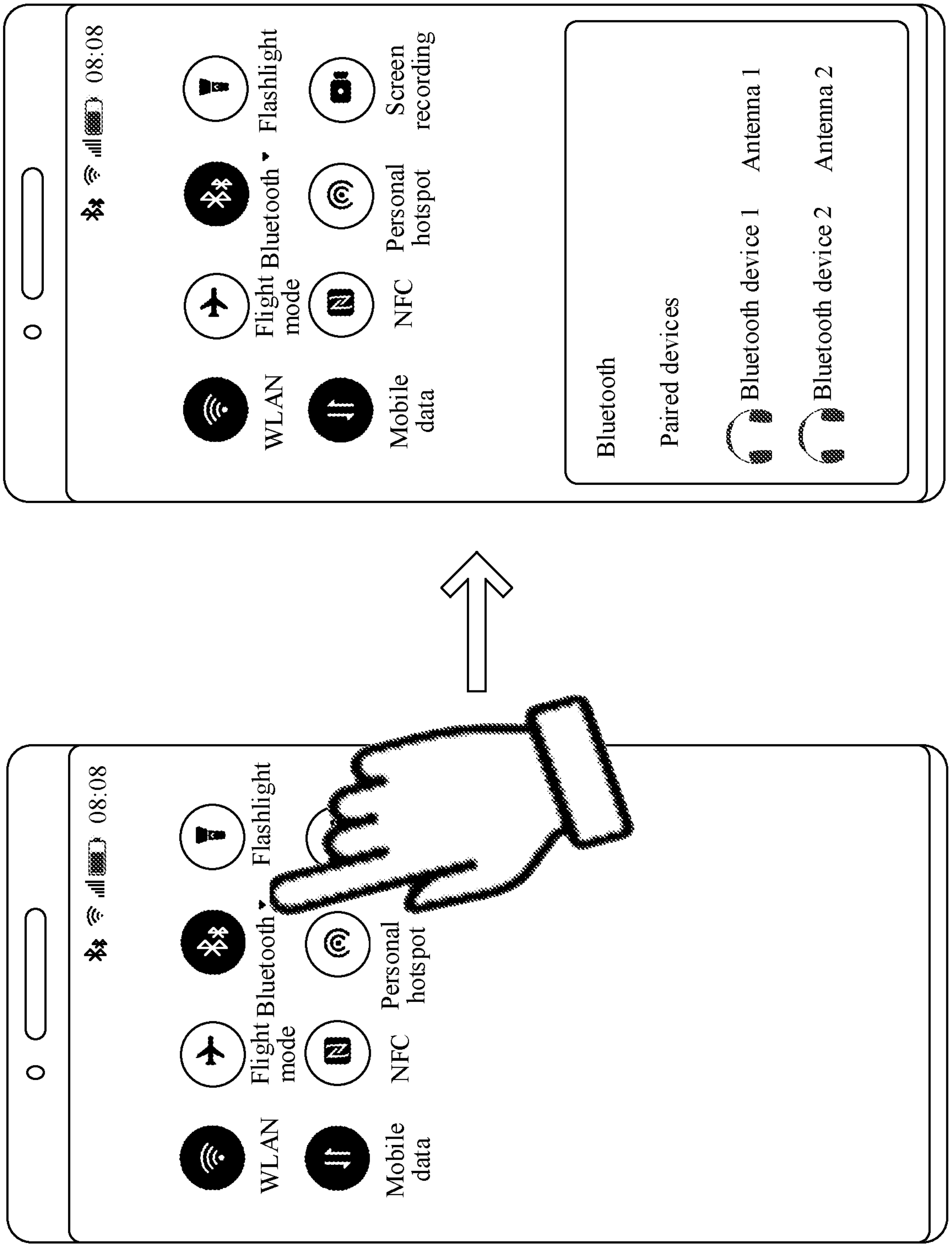
FIG. 7 is a schematic diagram of another display interface according to an embodiment of this application.
Figure 8:
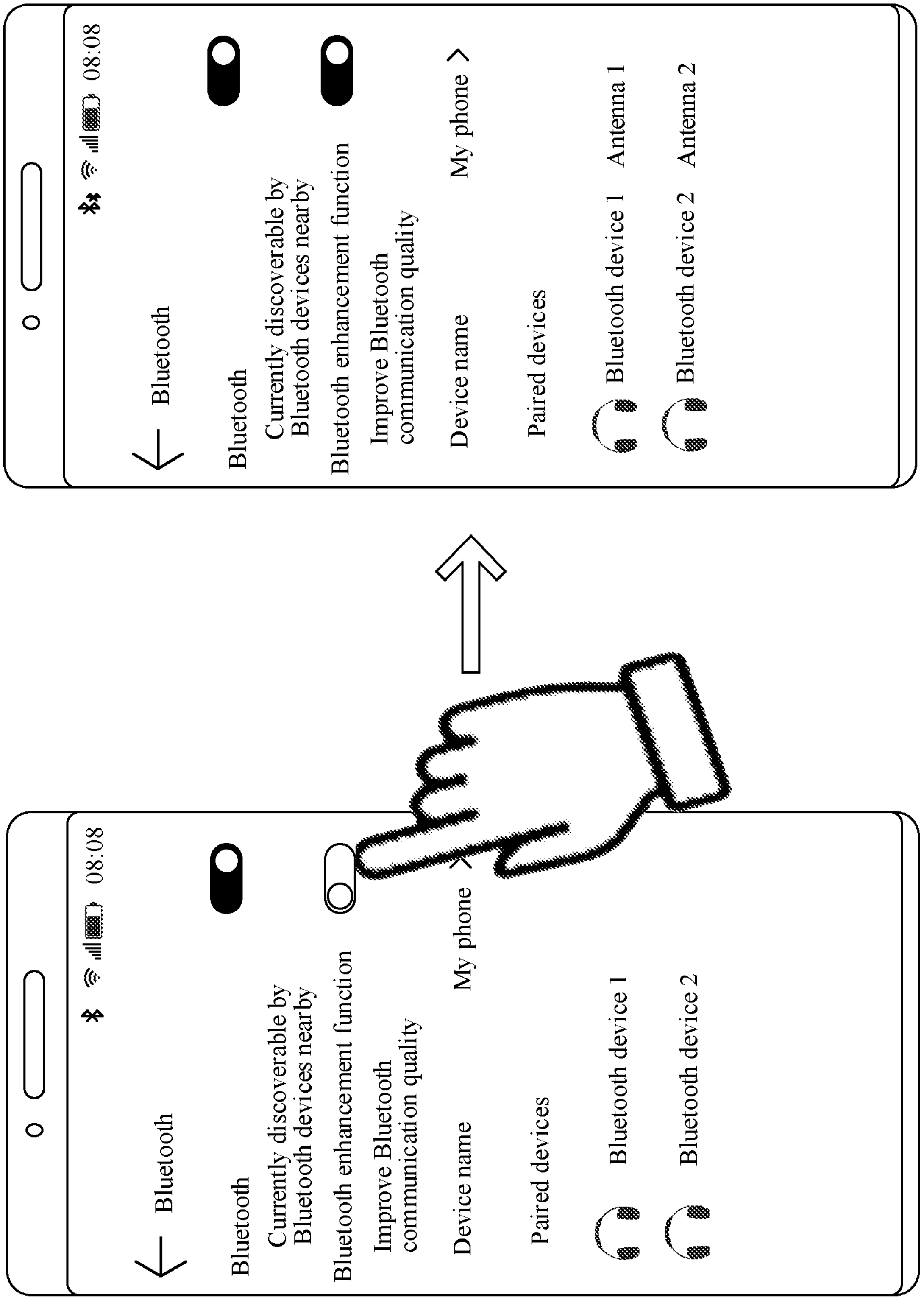
FIG. 8 is a schematic diagram of yet another display interface according to an embodiment of this application.

Since the electronic device can support Bluetooth communication (or pairing) with multiple other devices, the processor 31 can switch all or some of Bluetooth communication from the first FEM 34 to the second FEM 35 to improve the quality of Bluetooth communication. Exemplarily, as shown in FIG. 6, the improvement of the quality of Bluetooth communication may be indicated by the change of the Bluetooth icon in the state bar of the electronic device from A to B, and the improvement of the quality of Bluetooth communication may also be indicated by the change of the Bluetooth icon from C to D in the drop-down menu, where A and C represent ordinary Bluetooth communication functions, and B and D represent enhanced Bluetooth communication functions. As shown in FIG. 7, a Bluetooth pairing interface can be enabled by clicking on the triangle icon next to the Bluetooth icon in the drop-down menu, which displays different Bluetooth devices connected through different antennas. As shown in FIG. 8, whether a Bluetooth enhancement function switch is turned on may be displayed in a Bluetooth settings menu. When the Bluetooth enhancement function switch is turned on, the electronic device can perform the Bluetooth communication switching method according to this application, and can display different Bluetooth devices connected through different antennas. When the Bluetooth enhancement function switch is turned off, the electronic device does not perform the Bluetooth communication switching method according to this application.

In S103, when the communication state information of the first FEM 34 indicates that the first FEM 34 does not perform Wi-Fi communication (or referred to as disconnecting a Wi-Fi connection), the processor 31 transmits a second control command to the controller 322 in the switching circuit 32.

The second control command is used for controlling the switching circuit 32 to detect whether the MDM 33 transmits an MIPI command to the second FEM 35. When the MDM 33 does not transmit an MIPI command to the second FEM 35, the switching circuit 32 directly conducts the MDM 33 with the second FEM 35, so that the MDM 33 controls the second FEM 35 to perform cellular communication.

As shown in S1031-S1034 in FIG. 5, in the non-bypass mode, when the controller 322 in the switching circuit 32 receives the second control command from the processor 31, the controller 322 configures the mode switching register to the bypass mode and controls the bypass gating circuit 325 to switch to the bypass mode. At this time, the controller 322 detects whether the MDM 251 transmits an MIPI command to the second FEM 35 through the MIPI slave module 323. When it is detected that the MDM 251 does not transmit an MIPI command to the second FEM 35 (that is, the MIPI bus is idle), the controller 322 controls the bypass gating circuit 325 to directly conduct the MDM 251 with the second FEM 35, and transmits a second MIPI command to the second FEM 35 through the MIPI master module 324. The second MIPI command is used for instructing the second FEM 35 to perform cellular communication. Therefore, the MDM 251 can control the second FEM 35 to perform cellular communication. When it is detected that the MDM 251 transmits an MIPI command to the second FEM 35, it continues to wait until the MIPI bus is idle. That is to say; during the period that the MDM 251 does not transmit an MIPI command to the second FEM 35, the controller 322 switches the second FEM 35 from a Bluetooth communication state to a cellular communication state to avoid competing with the MDM 251 for the MIPI bus, thus avoiding transmission errors.

After the controller 322 transmits the second MIPI command to the second FEM 35 through the MIPI master module 324 to instruct the second FEM 35 to perform cellular communication, it also needs to transmit the previously cached MIPI command from the MDM 251 to the second FEM 35 through the MIPI master module 324, so that the control logic between the MDM 251 and the second FEM 35 remains consistent before and after switching.

In the wireless communication circuit, the Bluetooth communication switching method and the electronic device provided in the embodiments of this application, the first FEM supports wireless fidelity Wi-Fi communication or Bluetooth communication; when the first FEM performs Wi-Fi communication and the MDM does not transmit an MIPI command to the second FEM, the second FEM is controlled to perform Bluetooth communication, thus switching some or all of Bluetooth communication of the first FEM to a relatively idle second FEM, preventing time-division multiplexing of Wi-Fi communication and Bluetooth communication from occupying resources for Bluetooth communication, and improving the communication quality of Bluetooth communication.

Figure 9:
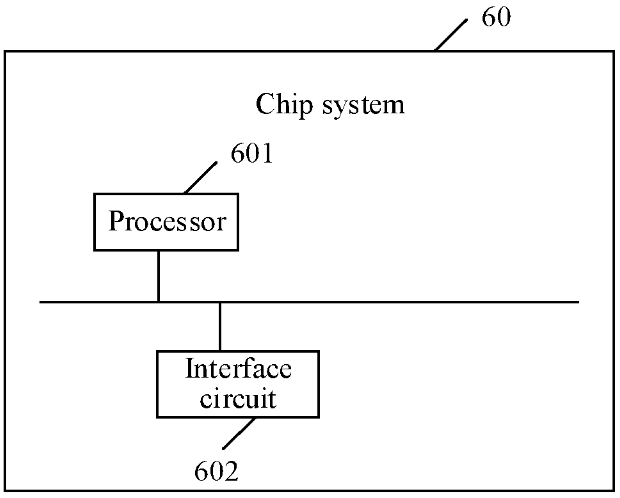
FIG. 9 is a schematic structural diagram of a chip system according to an embodiment of this application.

As shown in FIG. 9, an embodiment of this application further provides a chip system. The chip system 60 includes at least one processor 601 and at least one interface circuit 602. The at least one processor 601 and the at least one interface circuit 602 may be interconnected through a line.

The processor 601 is configured to support the electronic device to implement various steps in the foregoing method embodiments, such as the methods shown in FIG. 4 and FIG. 5. The at least one interface circuit 602 may be configured to receive signals from another apparatus (such as a memory), or to transmit signals to another apparatus (such as a communication interface). The chip system may include a chip, or may include other discrete devices.

An embodiment of this application further provides a computer-readable storage medium, and the computer-readable storage medium includes instructions. The instructions, when run on an electronic device, cause the electronic device to perform various steps in the foregoing method embodiments, such as the methods shown in FIG. 4 and FIG. 5.

An embodiment of this application further provides a computer program product including instructions. The instructions, when run on an electronic device, cause the electronic device to perform various steps in the foregoing method embodiments, such as the methods shown in FIG. 4 and FIG. 5.

For the technical effects of the chip system, the computer-readable storage medium and the computer program product, a reference may be made to the technical effects of the above-mentioned method embodiments.

It should be understood that sequence numbers of the foregoing processes do not mean execution sequences in various embodiments of this application. The execution sequences of the processes should be determined according to functions and internal logic of the processes, and should not constitute any limitation on the implementation processes of the embodiments of this application.

A person of ordinary skill in the art may be aware that, in combination with the examples described in the embodiments disclosed in this specification, modules and algorithm steps may be implemented by electronic hardware or a combination of computer software and electronic hardware. Whether these functions are performed in the form of hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the objective of convenient and brief description, for a detailed working process of the system, apparatus, and module described above, refer to a corresponding process in the method embodiments, and details are not described herein again.

In the several embodiments provided in this application, it should be understood that the disclosed system, device and method may be implemented in other manners. For example, the described device embodiments are merely exemplary. For example, division of the modules is merely logical function division and there may be other division manners during actual implementation. For example, a plurality of modules or components may be combined or integrated into another device, or some features may be ignored or not performed. In addition, the displayed or discussed mutual couplings or direct couplings or communication connections may be implemented by using some interfaces. The indirect couplings or communication connections between the devices or modules may be implemented in electronic, mechanical, or other forms.

The modules described as separate components may or may not be physically separate, and components displayed as modules may or may not be physical modules, may be located in one device, or may be distributed on a plurality of devices. Some or all of the modules may be selected according to the actual needs to achieve the objectives of the solutions of the embodiments.

In addition, functional modules in the embodiments of this application may be integrated into one device, or each of the modules may exist alone physically, or two or more modules may be integrated into one device.

All or some of the foregoing embodiments may be implemented by using software, hardware, firmware, or any combination thereof. When a software program is used to implement the embodiments, the embodiments may be implemented in whole or in part in a form of a computer program product. The computer program product includes one or more computer instructions. When the computer program instructions are loaded and executed on a computer, all or some of the processes or functions according to the embodiments of this application are produced. The computer may be a general-purpose computer, a dedicated computer, a computer network, or any of other programmable apparatuses. The computer instructions may be stored in a computer-readable storage medium or transmitted from one computer-readable storage medium to another computer-readable storage medium. For example, the computer instructions may be transmitted from one website, computer, server or data center to another website, computer, server or data center in a wired (for example, a coaxial cable, an optical fiber or a digital subscriber line (digital subscriber line, DSL)) or wireless (for example, infrared, wireless or microwave, etc.) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid-State Drive, SSD)), or the like.

The foregoing descriptions are merely specific implementations of this application, but are not intended to limit the scope of protection of this application. Any variation or replacement readily figured out by a person skilled in the art within the technical scope disclosed in this application shall fall within the scope of protection of this application. Therefore, the scope of protection of this application shall be subject to the scope of protection of the claims.

The invention claimed is:

1. A wireless communication circuit, comprising:
- a switching circuit, comprising:
  - a controller;
  - a mobile industry processor interface (MIPI) slave module;
  - a MIPI master module; and
  - a bypass gating circuit;
- a modulator demodulator, wherein the controller is coupled to the modulator demodulator through the MIPI slave module and the bypass gating circuit;
- a first front-end module (FEM) that supports wireless fidelity (Wi-Fi) communication or Bluetooth communication;
- a second FEM that supports cellular communication or Bluetooth communication, wherein the second FEM is coupled to the modulator demodulator through the switching circuit, and wherein the second FEM is coupled to the controller through the MIPI master module and the bypass gating circuit; and a processor coupled to the switching circuit, the modulator demodulator, and the first FEM, wherein the processor is configured to:

acquire communication state information of the first FEM; and transmit, in response to the communication state information indicating that the first FEM performs Wi-Fi communication, a first control command to the switching circuit, wherein the first control command is for controlling the MIPI slave module to detect whether the modulator demodulator transmits an MIPI command to the second FEM, and control the second FEM to perform Bluetooth communication through the MIPI master module and the bypass gating circuit when the modulator demodulator does not transmit an MIPI command to the second FEM.

2. The wireless communication circuit of claim 1, wherein the MIPI slave module is configured to convert an MIPI command from the modulator demodulator from a MIPI bus format to an on-chip bus format and transmit the on-chip bus format MIPI command to the controller, wherein the MIPI master module is configured to convert an MIPI command from the controller from the on-chip bus format to the MIPI bus format and transmit the MIPI bus format MIPI command to the second FEM through the bypass gating circuit, wherein the controller is configured to receive the first control command and control the bypass gating circuit to conduct the MIPI slave module with the modulator demodulator and conduct the MIPI master module with the second FEM, and detect whether the modulator demodulator transmits an MIPI command to the second FEM through the MIPI slave module, and wherein when the modulator demodulator does not transmit an MIPI command to the second FEM, the controller is configured to transmit a first MIPI command to the second FEM through the MIPI master module, wherein the first MIPI command is for instructing the second FEM to perform Bluetooth communication.

3. The wireless communication circuit of claim 2, wherein after the first MIPI command is transmitted to the second FEM through the MIPI master module, the controller is further configured to receive and cache an MIPI command from the modulator demodulator through the MIPI slave module.

4. The wireless communication circuit of claim 3, wherein the processor is configured to transmit the first control command to the switching circuit after a preset time when the communication state information indicates that the first FEM performs Wi-Fi communication.

5. The wireless communication circuit of claim 4, wherein the processor is configured to transmit the first control command to the switching circuit when the communication state information indicates that the first FEM performs Wi-Fi communication and a number of times that the first FEM switches between performing Wi-Fi communication and skipping performing Wi-Fi communication within a first preset time is less than a number threshold.

6. The wireless communication circuit of claim 3, wherein the processor is configured to transmit the first control command to the switching circuit when the communication state information indicates that the first FEM performs Wi-Fi communication and a number of times that the first FEM switches between performing Wi-Fi communication and skipping performing Wi-Fi communication within a first preset time is less than a number threshold.

7. The wireless communication circuit of claim 1, wherein when the communication state information indicates that the first FEM performs Wi-Fi communication, the processor is configured to transmit the first control command to the switching circuit after a preset time.

8. The wireless communication circuit of claim 1, wherein when the communication state information indicates that the first FEM performs Wi-Fi communication and a number of times that the first FEM switches between performing Wi-Fi communication and skipping performing Wi-Fi communication within a first preset time is less than a number threshold the processor is configured to transmit the first control command to the switching circuit.

9. The wireless communication circuit of claim 8, wherein when the number of times that the first FEM switches between performing Wi-Fi communication and skipping performing Wi-Fi communication within the first preset time is greater than or equal to the number threshold, the processor is configured to acquire the communication state information after a second preset time.

10. A method, comprising:

acquiring communication state information of a first front-end module (FEM), wherein the first FEM supports wireless fidelity (Wi-Fi) communication or Bluetooth communication;

transmitting, in response to the communication state information indicating that the first FEM performs Wi-Fi communication, a first control command to a controller in a switching circuit, wherein the first control command is for controlling a mobile industry processor interface (MIPI) slave module in the switching circuit to detect whether a modulator demodulator transmits an MIPI command to a second FEM; and controlling, when the modulator demodulator does not transmit an MIPI command to the second FEM, the second FEM to perform Bluetooth communication, wherein the second FEM supports cellular communication or Bluetooth communication through an MIPI master module and a bypass gating circuit in the switching circuit.

11. The method of claim 10, further comprising:

receiving the first control command and controlling the bypass gating circuit to conduct the MIPI slave module with the modulator demodulator and conduct the MIPI master module with the second FEM;

detecting whether the modulator demodulator transmits an MIPI command to the second FEM through the MIPI slave module; and transmitting, when the modulator demodulator does not transmit an MIPI command to the second FEM, a first MIPI command to the second FEM through the MIPI master module, wherein the first MIPI command is for instructing the second FEM to perform Bluetooth communication.

12. The method of claim 11, further comprising receiving and caching, after the first MIPI command is transmitted to the second FEM through the MIPI master module, an MIPI command from the modulator demodulator through the MIPI slave module.

13. The method of claim 12, wherein when the communication state information indicates that the first FEM performs Wi-Fi communication, the first control command is transmitted to the switching circuit after a preset time.

14. The method according to claim 13, wherein the first control command is transmitted to the switching circuit when the communication state information indicates that the first FEM performs Wi-Fi communication and a number of times that the first FEM switches between performing Wi-Fi communication and skipping performing Wi-Fi communication within a first preset time is less than a number threshold.

15. The method according to claim 12, wherein the first control command is transmitted to the switching circuit when the communication state information indicates that the first FEM performs Wi-Fi communication and a number of times that the first FEM switches between performing Wi-Fi communication and skipping performing Wi-Fi communication within a first preset time is less than a number threshold.

16. The method of claim 10, wherein when the communication state information indicates that the first FEM performs Wi-Fi communication, the first control command is transmitted to the switching circuit after a preset time.

17. The method of claim 10, wherein the first control command is transmitted to the switching circuit when the communication state information indicates that the first FEM performs Wi-Fi communication and a number of times that the first FEM switches between performing Wi-Fi communication and skipping performing Wi-Fi communication within a first preset time is less than a number threshold.

18. The method according to claim 17, further comprising acquiring the communication state information after second preset time when the number of times that the first FEM switches between performing Wi-Fi communication and skipping performing Wi-Fi communication within the first preset time is greater than or equal to the number threshold.

19. An electronic device, comprising:

a switching circuit, comprising:

a controller;

a mobile industry processor interface (MIPI) slave module;

a MIPI master module; and a bypass gating circuit;

a modulator demodulator, wherein the controller is coupled to the modulator demodulator through the MIPI slave module and the bypass gating circuit;

a first front-end module (FEM) that supports wireless fidelity (Wi-Fi) communication or Bluetooth communication;

a second FEM that supports cellular communication or Bluetooth communication, wherein the second FEM is coupled to the modulator demodulator through the switching circuit, and wherein the second FEM is coupled to the controller through the MIPI master module and the bypass gating circuit;

one or more processors coupled to the switching circuit, the modulator demodulator, and the first FEM; and a memory coupled to the one or more processors and configured to store instructions that, when executed by the one or more processors, cause the electronic device to be configured to:

acquire communication state information of the first FEM; and transmit, in response to the communication state information indicating that the first FEM performs Wi-Fi communication, a first control command to the switching circuit, wherein the first control command is for controlling the MIPI slave module to detect whether the modulator demodulator transmits an MIPI command to the second FEM, and control the second FEM to perform Bluetooth communication through the MIPI master module and the bypass gating circuit when the modulator demodulator does not transmit an MIPI command to the second FEM.

20. The electronic device of claim 19, wherein the MIPI slave module is configured to convert an MIPI command from the modulator demodulator from a MIPI bus format to an on-chip bus format and transmit the on-chip bus format MIPI command to the controller, wherein the MIPI master module is configured to convert an MIPI command from the controller from the on-chip bus format to the MIPI bus format and transmit the MIPI bus format MIPI command to the second FEM through the bypass gating circuit, wherein the controller is configured to receive the first control command and control the bypass gating circuit to conduct the MIPI slave module with the modulator demodulator and conduct the MIPI master module with the second FEM, and detect whether the modulator demodulator transmits an MIPI command to the second FEM through the MIPI slave module, and wherein when the modulator demodulator does not transmit an MIPI command to the second FEM, the controller is configured to transmit a first MIPI command to the second FEM through the MIPI master module, wherein the first MIPI command is for instructing the second FEM to perform Bluetooth communication.

* * * * *